(12) United States Patent
Shimizu et al.

(10) Patent No.: US 10,189,167 B2
(45) Date of Patent: Jan. 29, 2019

(54) SUCTION DEVICE, HOLDING DEVICE, AND CONVEYANCE METHOD

(71) Applicant: MITSUBISHI HEAVY INDUSTRIES, LTD., Tokyo (JP)

(72) Inventors: Takayuki Shimizu, Tokyo (JP); Naoto Azusawa, Tokyo (JP); Kenichi Tsuruda, Tokyo (JP); Hiroki Azuma, Tokyo (JP); Takuya Goto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/558,187

(22) PCT Filed: Jul. 1, 2016

(86) PCT No.: PCT/JP2016/069653
§ 371 (c)(1),
(2) Date: Sep. 13, 2017

(87) PCT Pub. No.: WO2017/010320
PCT Pub. Date: Jan. 19, 2017

(65) Prior Publication Data
US 2018/0071924 A1    Mar. 15, 2018

(30) Foreign Application Priority Data
Jul. 13, 2015    (JP) .................. 2015-139540

(51) Int. Cl.
*B25J 15/06*    (2006.01)
*B25J 15/00*    (2006.01)

(52) U.S. Cl.
CPC ....... *B25J 15/0683* (2013.01); *B25J 15/0061* (2013.01); *B25J 15/065* (2013.01); *B25J 15/0691* (2013.01)

(58) Field of Classification Search
CPC .. B25J 15/0683; B25J 15/065; B25J 15/0441; B25J 15/0616; B25J 15/0691
(Continued)

(56) References Cited

U.S. PATENT DOCUMENTS 3,415,388 A * 12/1968 Domhan ............... A23G 7/0025
                                                    294/188
7,628,434 B2 * 12/2009 Bruce .................. B65G 49/061
                                                    269/21
(Continued)

FOREIGN PATENT DOCUMENTS

DE    202007013673 U1    2/2009
EP           0429901 A1 *  6/1991    .......... B25J 15/0009
(Continued)

OTHER PUBLICATIONS

International Search Report in PCT/JP2016/069653 dated Aug. 23, 2016. 3pp.

*Primary Examiner* — Gabriela M Puig
(74) *Attorney, Agent, or Firm* — Kanesaka Berner and Partners LLP

(57) ABSTRACT

A suction device is attached to a leading-end section of an articulated arm, attached by suction to a plate-shaped structural member having a curvature at least in a predetermined direction. The suction device includes a support part attached to the leading-end section of the articulated arm; a pair of suction mechanisms having a pair of suction surfaces and disposed apart from each other in an X direction with the attachment position of the support part to the leading-end section interposed between the pair of suction mechanisms; and a pair of first angle adjustment mechanisms capable of adjusting the angle of inclination, in the X direction, of each of the pair of suction surfaces of the pair of the suction mechanisms.

9 Claims, 15 Drawing Sheets

(58) Field of Classification Search
USPC .............................. 294/188, 189, 65; 901/40
See application file for complete search history.

(56) References Cited

U.S. PATENT DOCUMENTS

| | | | |
|---|---|---|---|
| 7,971,916 B2* | 7/2011 | Lin ..................... | B25J 15/0052 |
| | | | 269/24 |
| 9,498,887 B1* | 11/2016 | Zevenbergen ....... | B25J 15/0616 |
| 2002/0138962 A1* | 10/2002 | Martin ................... | B23P 19/04 |
| | | | 29/430 |
| 2004/0094979 A1* | 5/2004 | Damhuis .............. | B25J 15/0052 |
| | | | 294/65 |
| 2005/0263949 A1 | 12/2005 | Boyl-Davis et al. | |
| 2006/0277733 A1 | 12/2006 | Boyl-Davis et al. | |
| 2006/0291951 A1 | 12/2006 | Van Zile, III et al. | |
| 2007/0200377 A1* | 8/2007 | Nishio ................. | B25B 11/005 |
| | | | 294/188 |
| 2007/0200378 A1* | 8/2007 | Johnson ............... | B66C 1/0256 |
| | | | 294/65 |
| 2009/0133261 A1 | 5/2009 | Boyl-Davis et al. | |
| 2014/0008928 A1* | 1/2014 | Collado Jimenez ........................ | |
| | | | B25J 15/0061 |
| | | | 294/183 |
| 2015/0367517 A1 | 12/2015 | Eisele et al. | |
| 2016/0339590 A1* | 11/2016 | Lin ..................... | B25J 15/0061 |
| 2017/0129109 A1 | 5/2017 | Mukou et al. | |
| 2018/0066790 A1* | 3/2018 | Azusawa .............. | F16M 11/06 |

FOREIGN PATENT DOCUMENTS

| | | |
|---|---|---|
| FR | 2974024 A1 | 10/2012 |
| JP | 2010-253596 A | 11/2010 |
| JP | 5265718 B2 | 8/2013 |

\* cited by examiner

SUCTION DEVICE, HOLDING DEVICE, AND CONVEYANCE METHOD

RELATED APPLICATIONS

The present application is a National phase of International Application No. PCT/JP2016/069653, filed Jul. 1, 2016, and claims priority based on Japanese Patent Application No. 2015-139540, filed Jul. 13, 2015.

TECHNICAL FIELD

The present invention relates to a suction device that is attached by suction to a plate-shaped member, a holding device including the suction device, and a method of conveying the plate-shaped member.

BACKGROUND ART

A conventional system is known that conveys a large structural member, such as an aircraft fuselage, by suction (for example, see Patent Document 1).

Patent Document 1 discloses a system that attaches a vacuum cup to a rail formed along the shape of a curved workpiece to convey the workpiece by suction with the vacuum cup being in conformance with the shape of the curved workpiece.

CITATION LIST

Patent Document

Patent Document 1: Japanese Patent No. 5265718B

SUMMARY OF INVENTION

Technical Problems

Unfortunately, the system disclosed in Patent Document 1 uses the rail formed along the shape of a workpiece. Thus, to convey another workpiece having a different shape, a new system is required that uses another rail formed along the shape of the other workpiece.

This indicates that to convey a plurality of types of workpiece, it is necessary to prepare rails having shapes conforming to the respective workpieces and to replace the rails every time a workpiece to be conveyed is changed.

In light of the foregoing, an object of the present invention is to provide a suction device that can adjust the angles of suction surfaces appropriately for the shape of a plate-shaped member and can be attached by suction to the plate-shaped member, without preparing dedicated components for a plurality of types of plate-shaped members having a curvature in a predetermined direction or replacing the dedicated components every time the type of plate-shaped member to be conveyed is changed, a holding device including the suction device, and a method of conveying the plate-shaped member.

Solution to Problem

To solve the above-described problem, the present invention provides the following means.

A suction device according to one aspect of the present invention is attached to a leading-end section of an articulated drive mechanism and attached by suction to a plate-shaped member having a curvature at least in a predetermined direction. The suction device includes: a support part attached to the leading-end section of the articulated drive mechanism; a pair of suction mechanisms including a pair of suction surfaces and disposed apart from each other in a first direction with an attachment position of the support part attached to the leading-end section interposed between the pair of suction mechanisms; and a pair of first angle adjustment mechanisms capable of adjusting an angle of inclination, in the first direction, of each of the pair of suction surfaces of the pair of suction mechanisms.

The suction device according to the aspect of the present invention brings the pair of suction mechanisms close to the plate-shaped member so that the first direction coincides with the predetermined direction in which the plate-shaped member has a curvature, to thereby bring the pair of suction surfaces into contact with the plate-shaped member, the pair of suction mechanisms being disposed apart from each other in the first direction with the attachment position of the suction device to the leading-end section of the articulated drive mechanism interposed therebetween. The pair of suction mechanisms is attached by suction to the plate-shaped member with the pair of suction surfaces being in contact with the plate-shaped member, and the plate-shaped member is thus held by the leading-end section of the articulated drive mechanism. The plate-shaped member has a curvature in the predetermined direction; however, the first angle adjustment mechanisms adjust the angles of inclination of the suction surfaces in the first direction coinciding with the predetermined direction, so that each of the pair of suction surfaces is attached by suction to the plate-shaped member along the shape of the plate-shaped member having a curvature.

In this way, the suction device according to the aspect of the present invention can adjust the angles of inclination of the suction surfaces appropriately for the shape of the plate-shaped member having a curvature in the predetermined direction and can be attached by suction to the plate-shaped member, without preparing dedicated components for a plurality of types of plate-shaped member or replacing the dedicated components every time the type of plate-shaped member to be conveyed is changed.

In the suction device according to one aspect of the present invention, each of the pair of suction surfaces may be formed into a rectangle that is short in the first direction and long in a second direction orthogonal to the first direction.

This configuration allows the plate-shaped member having a curvature to be attached by suction in a pair of positions in the first direction along the shape of the plate-shaped member and to be securely attached by suction in a wide area in the second direction orthogonal to the first direction.

The suction device according to one aspect of the present invention, may further includes: a plurality of pairs of suction mechanisms arranged in the second direction, the plurality of pairs of suction mechanisms including first and second pairs of suction mechanisms adjacent to each other in the second direction; and a second angle adjustment mechanism disposed between the first pair of suction mechanisms and the second pair of suction mechanisms and capable of adjusting angles of inclination, in the second direction, of the pair of suction surfaces of the first pair of suction mechanisms and angles of inclination, in the second direction, of the pair of suction surfaces of the second pair of suction mechanisms.

With this configuration, even if the plate-shaped member has a double curved shape having a curvature in the predetermined direction and a curvature in a direction orthogonal to the predetermined direction (a shape having different curvatures in two axial directions in plane), the second angle adjustment mechanism adjusts the angles of inclination of the pair of suction surfaces in the direction orthogonal to the predetermined direction. The pair of suction surfaces are thus attached by suction to the plate-shaped member along the shape of the plate-shaped member having a curvature in the direction orthogonal to the predetermined direction.

In this way, this configuration ensures that the plate-shaped member is attached by suction along the double curved shape of the plate-shaped member with the pair of suction mechanisms.

A holding device according to one aspect of the present invention includes: the suction device according to any one of the above-described aspects; and an articulated drive mechanism including a leading-end section to which the suction device is attached.

The holding device according to the aspect of the present invention can adjust the angles of the suction surfaces appropriately for the shape of the plate-shaped member having a curvature in the predetermined direction and can be attached by suction to the plate-shaped member, without preparing dedicated components for a plurality of types of plate-shaped member or replacing the dedicated components every time the type of plate-shaped member to be conveyed is changed.

A method according to one aspect of the present invention is a method of conveying a plate-shaped member having a curvature in a predetermined direction with a holding device including an articulated drive mechanism and a suction device attached to a leading-end section of the articulated drive mechanism. The suction device includes: a support part attached to the leading-end section of the articulated drive mechanism; a pair of suction mechanisms including a pair of suction surfaces and disposed apart from each other in a first direction with an attachment position of the support part attached to the leading-end section interposed between the pair of suction mechanisms; and a pair of first angle adjustment mechanisms capable of adjusting an angle of inclination, in the first direction, of each of the pair of suction surfaces of the pair of suction mechanisms. The method includes the steps of: (a) with the pair of first angle adjustment mechanisms, adjusting the angles of inclination, in the first direction, of the pair of suction surfaces for the curvature of the plate-shaped member in the predetermined direction; (b) with the articulated drive mechanism, bringing the pair of suction surfaces into contact with the plate-shaped member with the predetermined direction coinciding with the first direction; (c) with the pair of suction mechanisms, attaching the plate-shaped member to the pair of suction surfaces by suction with the pair of suction surfaces being in contact with the plate-shaped member in step (b); and (d) with the articulated drive mechanism, conveying the plate-shaped member with the plate-shaped member attached by suction to the pair of suction surfaces in step (c).

By the method according to the aspect of the present invention, the pair of suction mechanisms is attached by suction to the plate-shaped member with the pair of suction surfaces being in contact with the plate-shaped member, and the plate-shaped member is thus held by the leading-end section of the articulated drive mechanism. The plate-shaped member has a curvature in the predetermined direction; however, the first angle adjustment mechanisms adjust the angles of inclination of the suction surfaces in the first direction coinciding with the predetermined direction, so that each of the pair of suction surfaces is attached by suction to the plate-shaped member along the shape of the plate-shaped member having a curvature. The plate-shaped member is then conveyed while being attached by suction to the pair of suction surfaces.

In this way, the method according to the aspect of the present invention can adjust the angles of the suction surfaces appropriately for the shape of the plate-shaped member having a curvature in the predetermined direction and can attach the plate-shaped member by suction and convey the plate-shaped member, without preparing dedicated components for a plurality of types of plate-shaped member or replacing the dedicated components every time the type of plate-shaped member to be conveyed is changed.

Advantageous Effects of Invention

The present invention can provide a suction device that can adjust the angles of suction surfaces appropriately for the shape of a plate-shaped member having a curvature in a predetermined direction and can be attached by suction to the plate-shaped member, without preparing dedicated components for a plurality of types of plate-shaped member or replacing the dedicated components every time the type of plate-shaped member to be conveyed is changed, a holding device including the suction device, and a method of conveying the plate-shaped member.

DESCRIPTION OF EMBODIMENTS

First Embodiment

An assembly system 700 according to a first embodiment of the present invention will be described below with reference to the drawings.

The assembly system 700 of the present embodiment positions a plurality of plate-shaped structural members 200

(plate-shaped members) each provided with a pair of positioning holes 220, 221 formed at both end in a long side direction of an assembly jig 100 (positioning device) and assembles the plate-shaped structural members 200 through processing, such as revetting.

Figure 1:
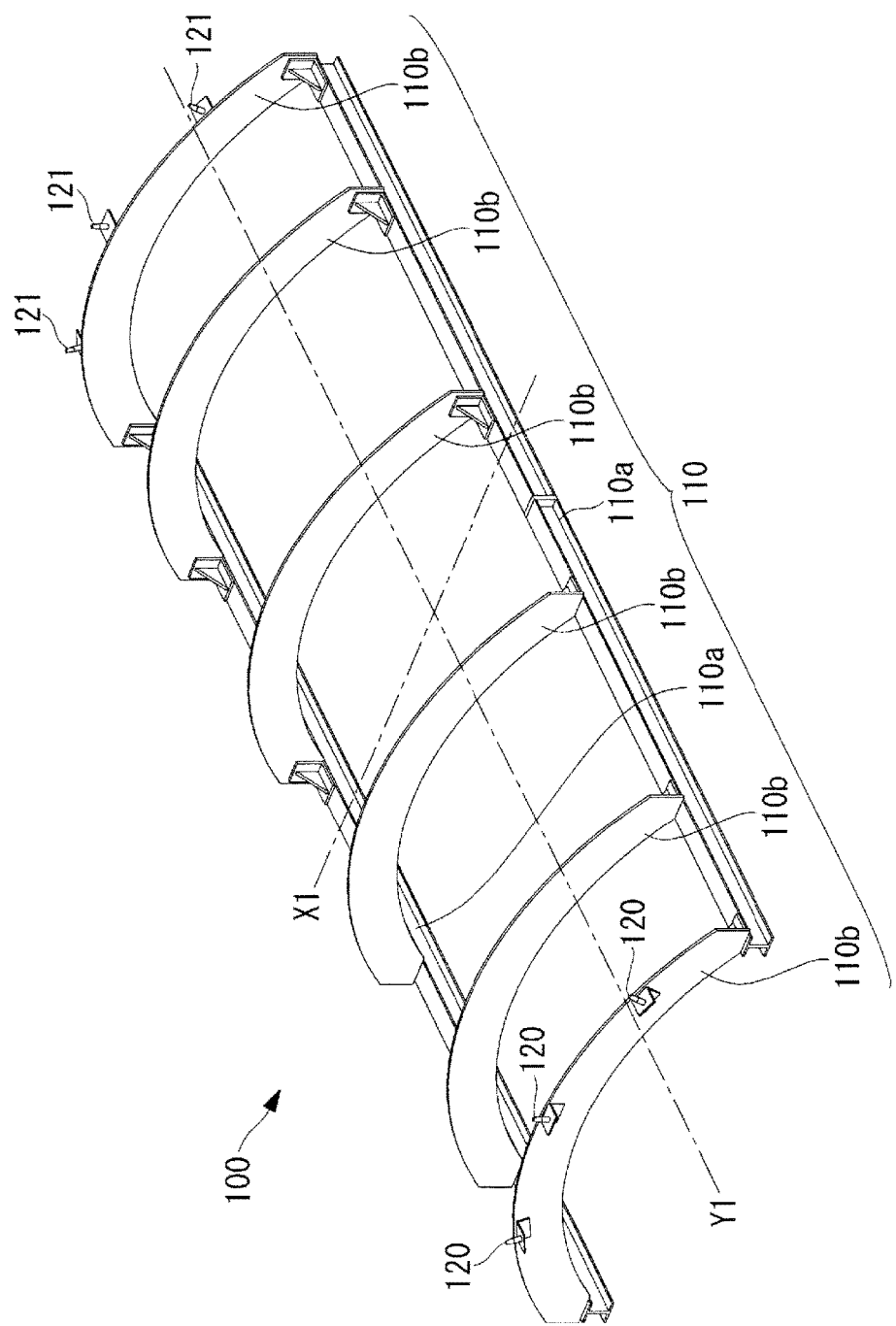
FIG. 1 is a perspective view of an assembly jig.

The assembly jig 100 illustrated in FIG. 1 is a device for positioning the plate-shaped structural members 200 each provided with the pair of positioning holes 220, 221 formed at both ends in the long side direction.

As illustrated in FIG. 1, the assembly jig 100 includes a support part 110 composed of a pair of first support members 110a and a plurality of second support members 110b, and pairs of positioning parts 120, 121 attached to the support part 110 and positioning the plate-shaped structural members 200 on the support part 110.

Each of the pair of first support members 110a is an elongated member arranged parallel to an axial line Y1 and fixed to an installation surface where the support part 110 is installed, with fastening bolts (not illustrated) or the like.

The second support members 110b each have one end fixed to one of the pair of first support members 110a and the other end fixed to the other of the pair of first support members 110a. As illustrated in FIG. 1, the second support members 110b are arranged parallel to each other and extend in the direction along an axial line X1 orthogonal to the axial line Y1.

As illustrated in FIG. 1, the second support members 110b have an arch shape having a central portion in the direction along the axial line X1 protruding upward from both ends with respect to the installation surface where the first support members 110a are installed. The second support members 110b have such an arch shape having a curvature, in order to support the bottom surfaces of the plate-shaped structural members 200 along their shapes. The second support members 110b support the bottom surfaces (first surfaces) of the plate-shaped structural members 200 in a plurality of positions in the direction along the axial line Y1.

The pair of positioning parts 120, 121 are arranged in the same positions in the direction along the axial line X1. Three pairs of the positioning parts 120, 121 are formed in three different positions in the direction along the axial line X1 on the second support members 110b disposed at both ends in the direction along the axial line Y1. Three plate-shaped structural members 200 can be positioned with the three pairs of positioning parts 120, 121.

Figure 2:
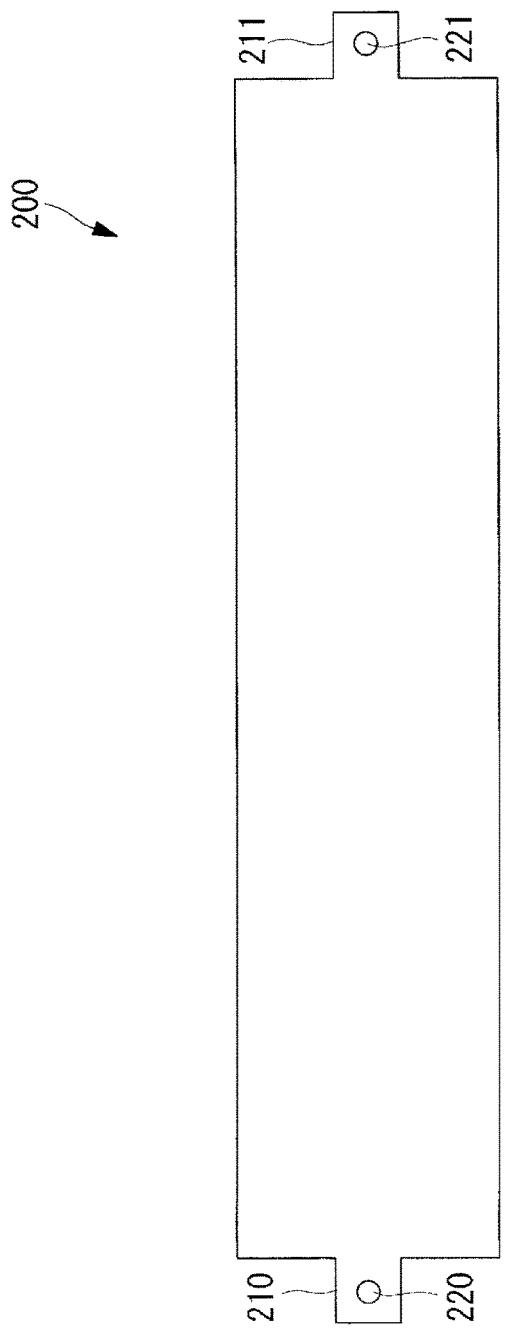
FIG. 2 is a plan view of a plate-shaped structural member.

As illustrated in FIG. 2, the plate-shaped structural member 200 is a plate-shaped member that is rectangular in plan view and that is provided with the pair of positioning holes 220, 221 formed at both end portions in the longitudinal side direction. A pair of protruding parts 210, 211 is formed at both end portions in the longitudinal direction of the plate-shaped structural member 200 while protruding outward. The pair of positioning holes 220, 221 are formed in the pair of protruding parts 210, 211.

Figure 3:
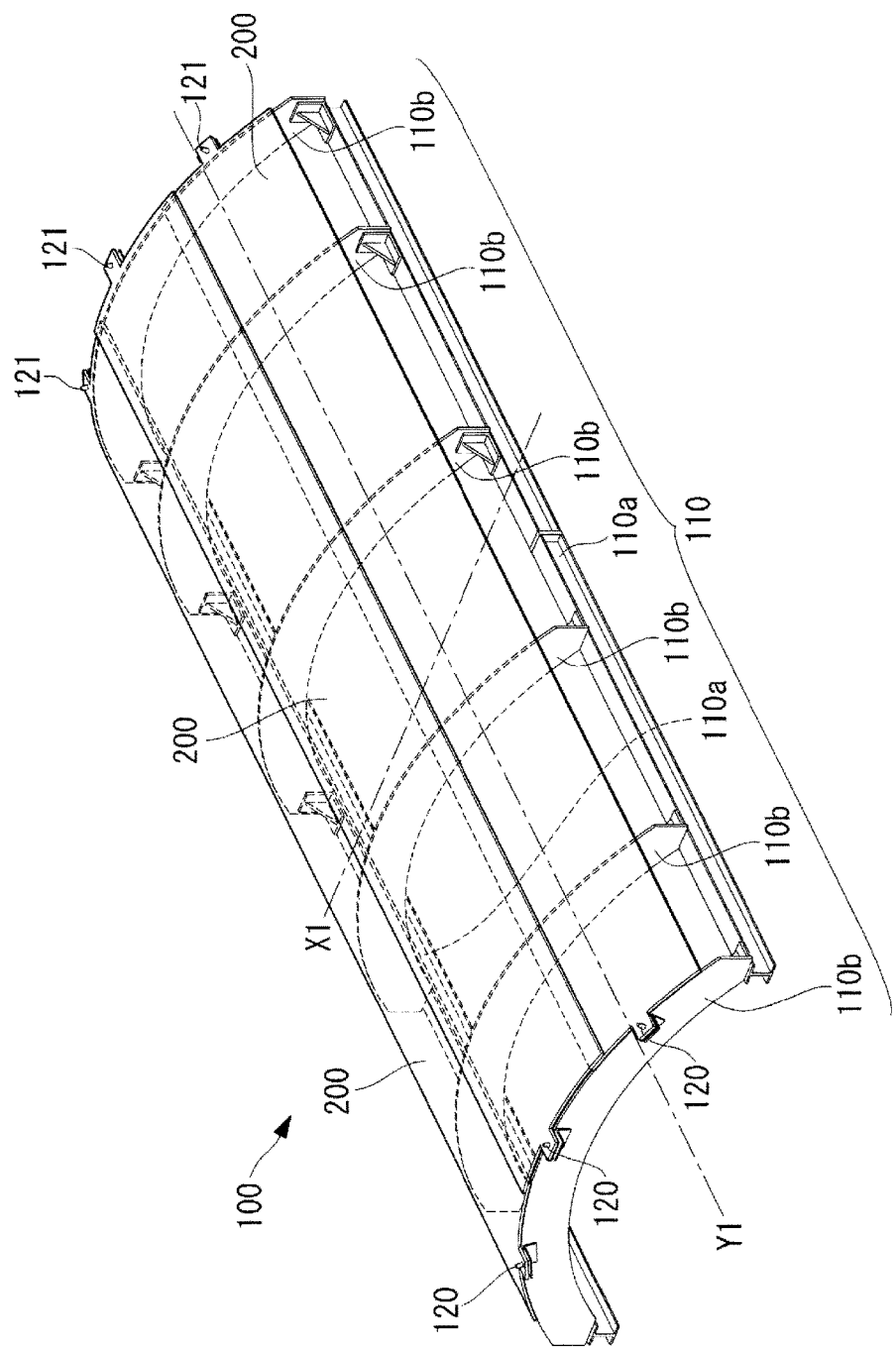
FIG. 3 is a perspective view of the assembly jig with the plate-shaped structural members positioned thereon.

As illustrated in the perspective view in FIG. 3, three plate-shaped structural members 200 are positioned on the support part 110 with the three pairs of positioning parts 120, 121 arranged in the three different positions in the direction along the axial line X1.

The plate-shaped structural member 200 of the present embodiment is, for example, a long structural member used for the fuselage or main wing of an aircraft. The long side and short side may have various lengths, and, for example, the long side has a length of from 8 to 10 m and the short side has a length of approximately 2 m. The plate-shaped structural member 200 has a thickness of, for example, from 3 to 5 mm.

The plate-shaped structural member 200 may be made from various materials, for example, an aluminum alloy.

The plate-shaped structural member 200 has no through-hole in FIG. 2 but may have one or more through-holes (for example, through-holes for attaching a window, formed in a plurality of positions of the plate-shaped structural member 200 used for an aircraft fuselage).

A process of positioning the plate-shaped structural member 200 on the assembly jig 100 with the assembly system 700 will now be described with reference to FIGS. 4 to 6.

Figure 4:
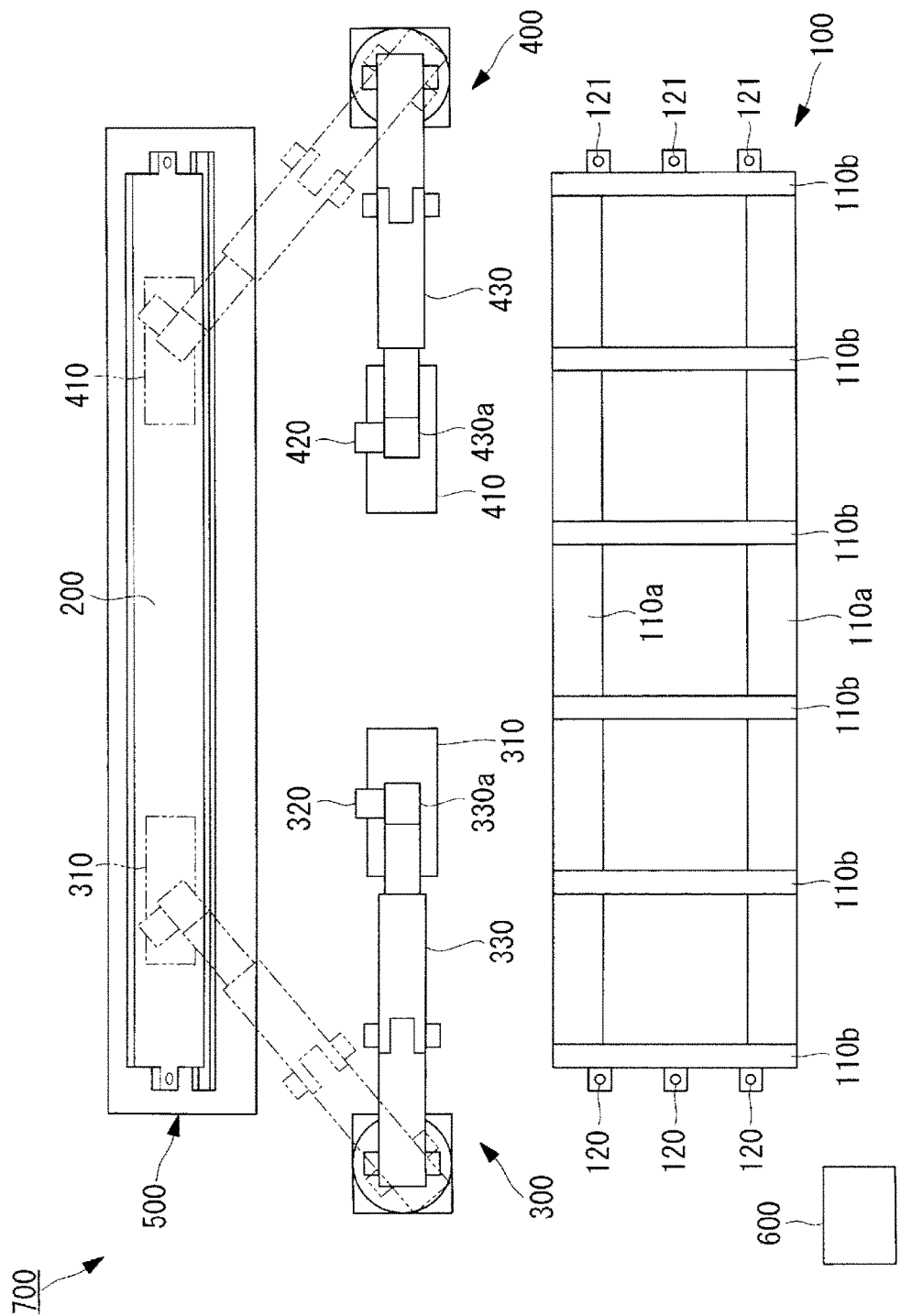
FIG. 4 is a plan view of a positioning system.

As illustrated in FIG. 4, the assembly system 700 includes the assembly jig 100, the plate-shaped structural member 200, a pair of holding devices 300, 400 that hold and move the plate-shaped structural member 200, a supplying stage 500 that temporarily retains the plate-shaped structural member 200 before the plate-shaped structural member 200 is supplied, and a control device 600 that controls the assembly system 700.

The pair of holding devices 300, 400 are vertical articulated robots including articulated arms 330, 430 (articulated drive mechanisms) and can position suction hands 310, 410 (suction devices) attached to leading-end sections 330a, 430a to desired positions in a three-dimensional space in desired postures.

The suction hands 310, 410 are configured to be attached by suction to the upper surface (second surface) of the plate-shaped structural member 200 by the action of negative pressure.

Imaging apparatuses 320, 420 are attached to the leading-end sections 330a, 430a of the articulated arms 330, 430.

The imaging apparatus 320 captures an image of the protruding part 210 of the plate-shaped structural member 200 to obtain image information and transmits the image information to the control device 600. The control device 600 calculates the position of the positioning hole 220 formed in the protruding part 210 on the basis of the image information received from the imaging apparatus 320 and the position and posture of the imaging apparatus 320 attached to the holding device 300.

Similarly, the imaging apparatus 420 captures an image of the protruding part 211 of the plate-shaped structural member 200 to obtain image information and transmits the image information to the control device 600. The control device 600 calculates the position of the positioning hole 221 formed in the protruding part 211 on the basis of the image information received from the imaging apparatus 420 and the position and posture of the imaging apparatus 420 attached to the holding device 400.

The pair of holding devices 300, 400 move the suction hands 310, 410 from initial positions indicated by the solid line in FIG. 4 to positions indicated by the dashed line in FIG. 4 and attach the suction hands 310, 410 to the upper surface of the plate-shaped structural member 200 by suction by the action of negative pressure.

Figure 5:
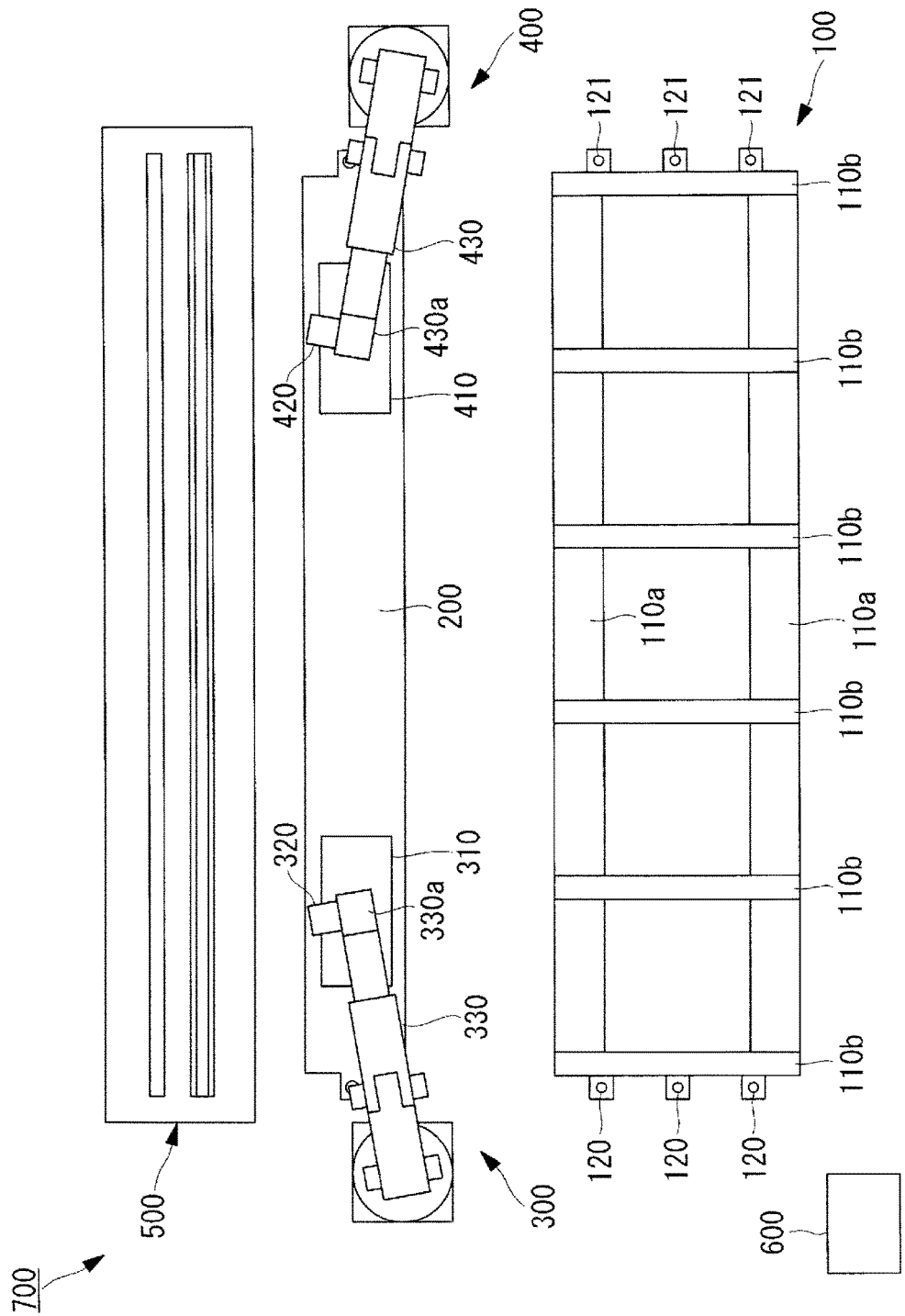
FIG. 5 is a plan view of the positioning system.

As illustrated in FIG. 5, the pair of holding devices 300, 400 cooperate with each other to move the plate-shaped structural member 200 retained on the supplying stage 500 toward the assembly jig 100 in a state where both ends in the longitudinal direction of the long plate-shaped structural member 200 attached by suction to the suction hands 310, 410.

Figure 6:
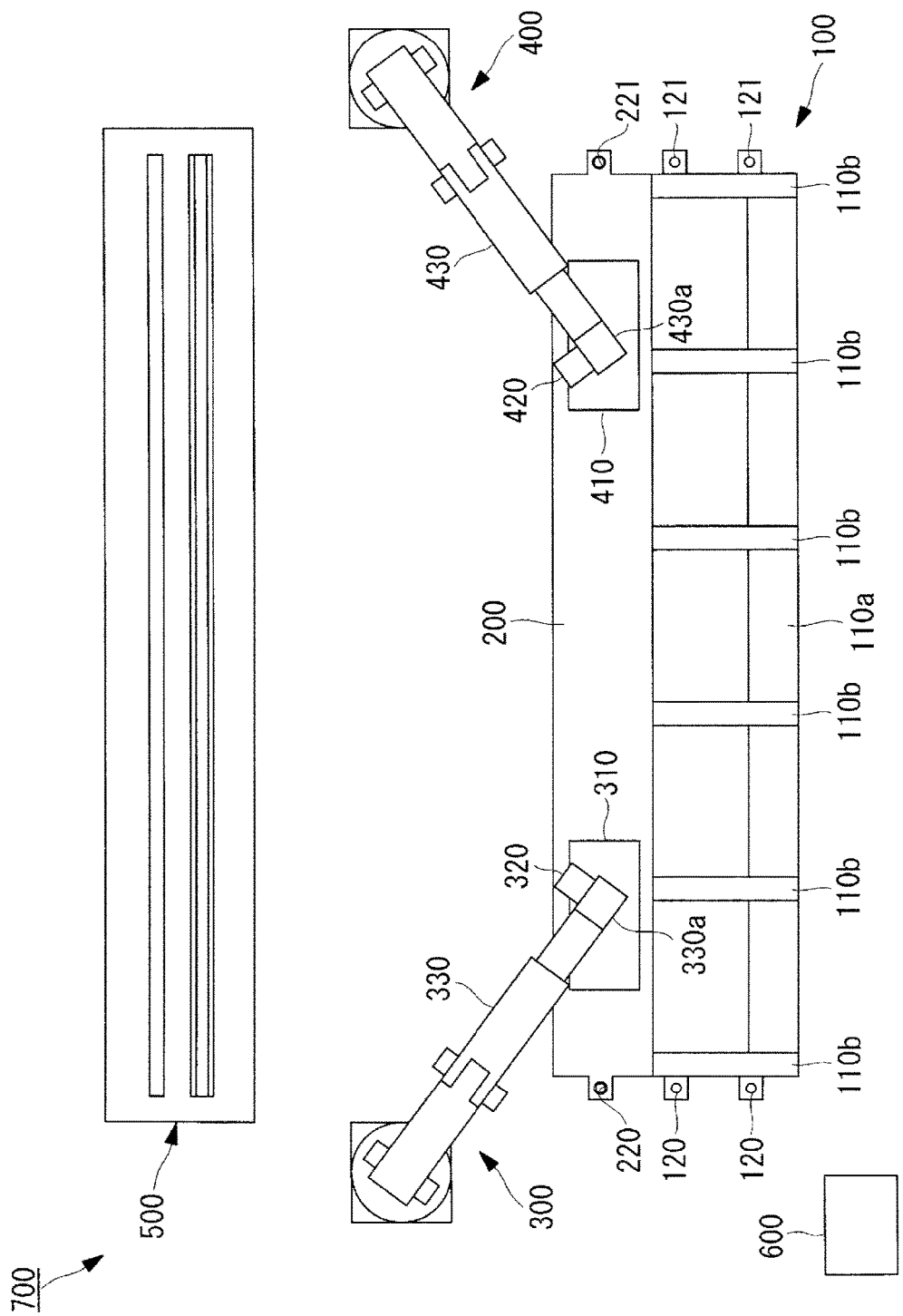
FIG. 6 is a plan view of the positioning system.

As illustrated in FIG. 6, the pair of holding devices 300, 400 move the plate-shaped structural member 200 so that the pair of positioning holes 220, 221 are disposed above the pair of positioning parts 120, 121 of the assembly jig 100. Then, the pair of holding devices 300, 400 move the plate-shaped structural member 200 downward so that the pair of positioning holes 220, 221 is positioned at the pair of positioning parts 120, 121.

The suction hands 310, 410 attached to the leading-end sections 330a, 430a of the articulated arms 330, 430 of the present embodiment will now be described with reference to FIGS. 7 to 13.

The suction hand 310 will be described in detail below. The suction hand 410 has the same structure as the suction hand 310, and descriptions thereof will thus be omitted.

Figure 7:
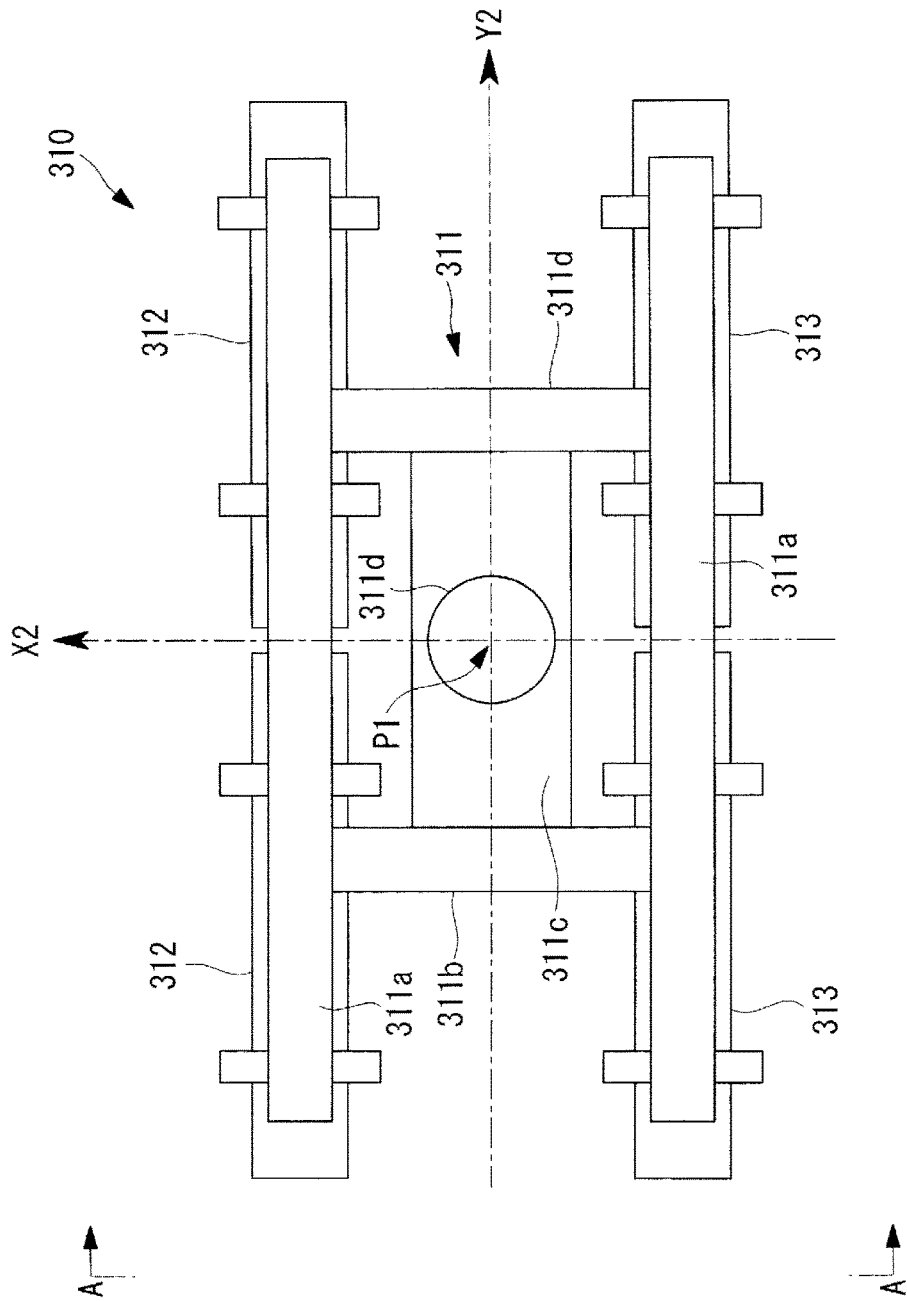
FIG. 7 is a plan view of a suction hand illustrated in FIG. 4.

As illustrated in the plan view in FIG. 7, the suction hand 310 includes a support part 311 that is attached to the leading-end section 330a of the articulated arm 330 and suction mechanisms 312, 313 that are disposed apart from each other in the direction of an axial line X2 (first direction) with an attachment position P1 of the support part 311 attached to the leading-end section 330a interposed therebetween. The suction hand 310 includes two pairs of the suction mechanisms 312, 313, the suction mechanisms 312, 313 in each of the pairs being arranged in the same position in the direction of an axial line Y2.

As illustrated in FIG. 7, the support part 311 includes a pair of first support members 311a extending along the axial line Y2 and disposed apart from each other in the direction of the axial line X2, a pair of second support members 311b extending along the axial line X2 and disposed apart from each other in the direction of the axial line Y2, a third support member 311c having both ends attached to the pair of second support members 311b, and a fourth support member 311d attached to the upper surface of the third support member 311c. The pair of second support members 311b each have both ends in the direction of the axial line X2 attached to the pair of first support members 311a.

Figure 8:
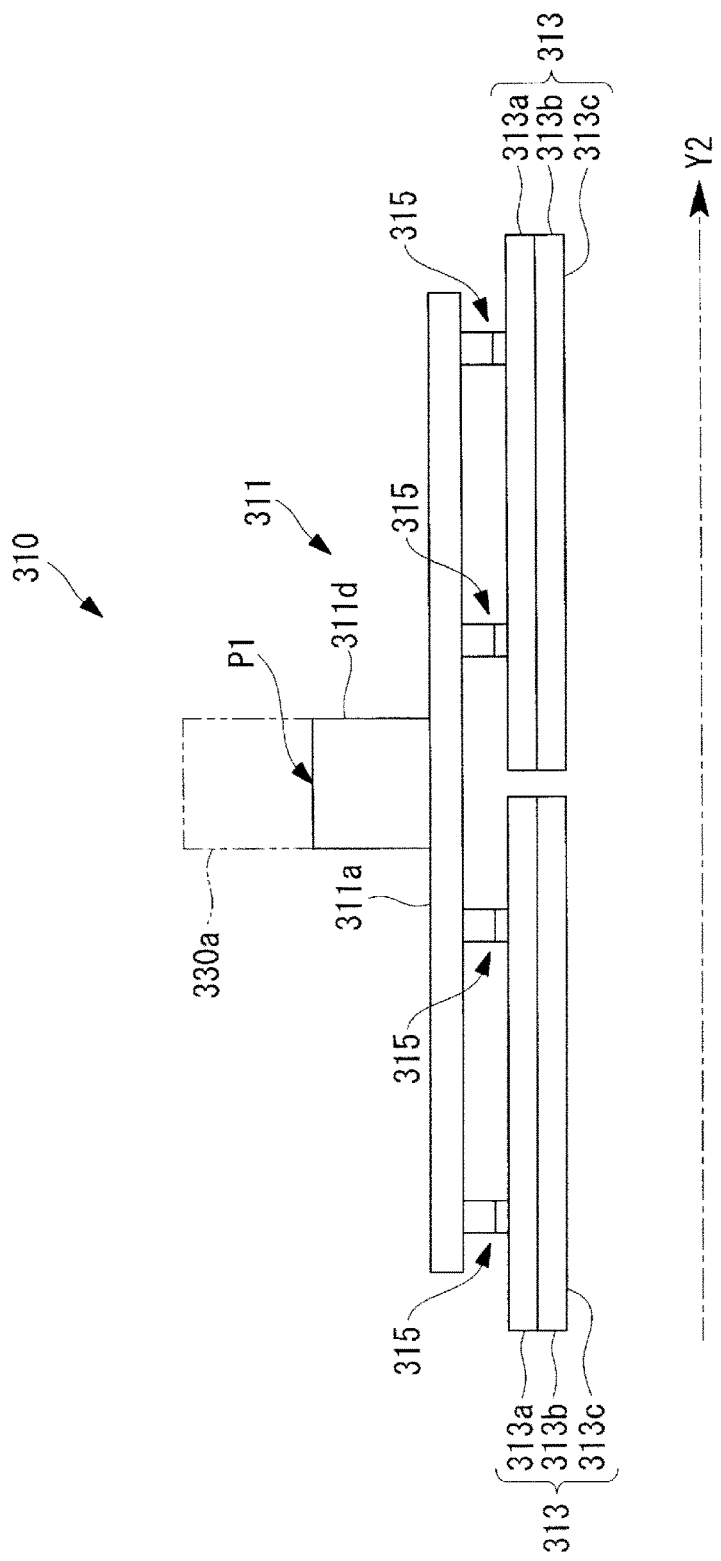
FIG. 8 is a front view of the suction hand illustrated in FIG. 4.

As illustrated in the front view in FIG. 8, each of the two suction mechanisms 313 is attached to the first support member 311a of the support part 311 via two first angle adjustment mechanisms 315.

The suction mechanism 313 includes a suction part 313a attached to the first support member 311a and a sponge part 313b attached to the suction part 313a. A suction surface 313c to which the plate-shaped structural member 200 is attached by suction is formed on a side, opposite to the surface attached to the suction part 313a, of the sponge part 313b.

Each of the two suction mechanisms 312 is attached to the first support member 311a of the support part 311 via two first angle adjustment mechanisms 314, which is not illustrated.

Figure 11:
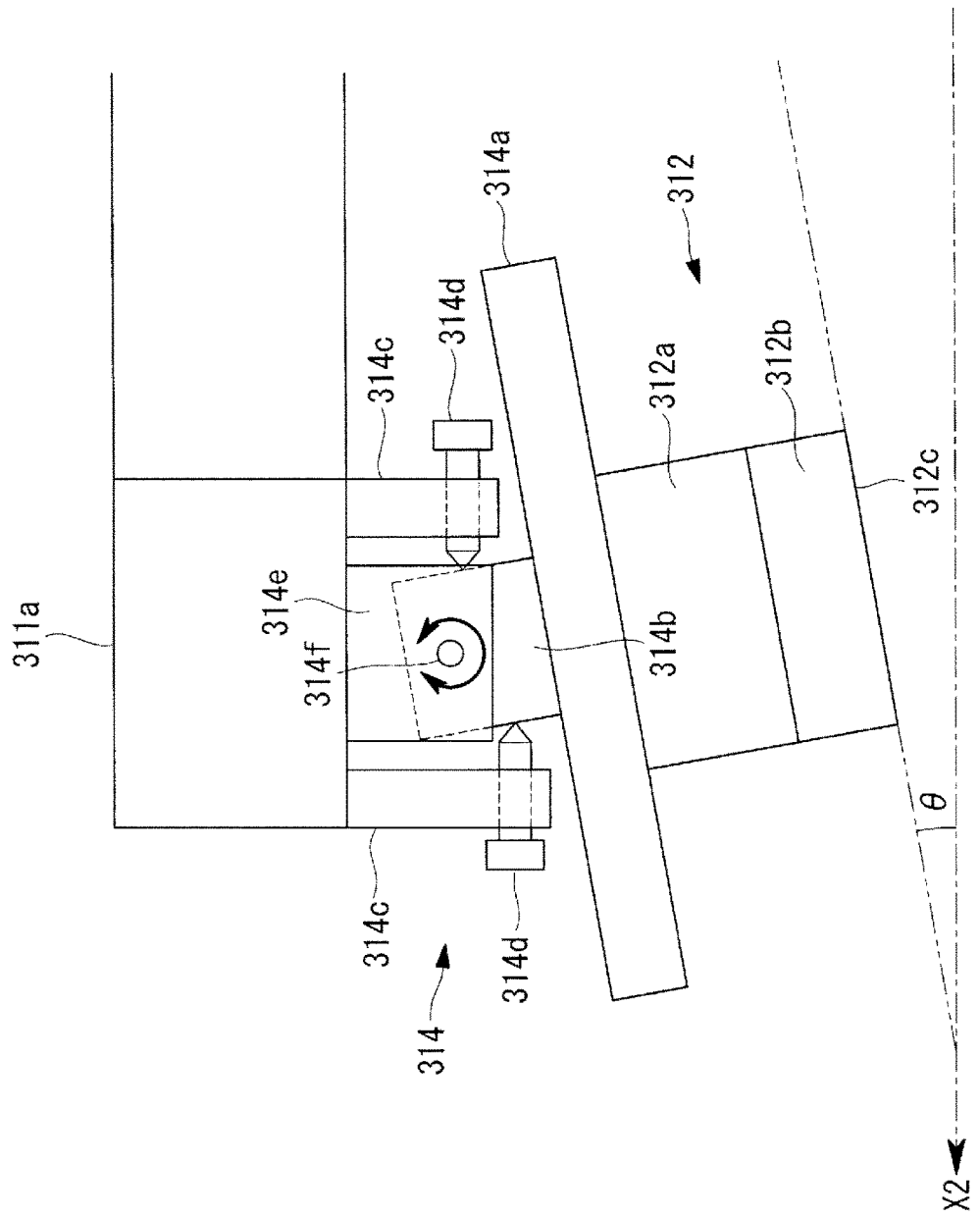
FIG. 11 is a partially enlarged view of a first angle adjustment mechanism illustrated in FIG. 10.

As illustrated in FIG. 11, the suction mechanism 312 includes a suction part 312a attached to the first support member 311a and a sponge part 312b attached to the suction part 312a. A suction surface 312c to which the plate-shaped structural member 200 is attached by suction is formed on a side, opposite to the surface attached to the suction part 312a, of the sponge part 312b.

Figure 9:
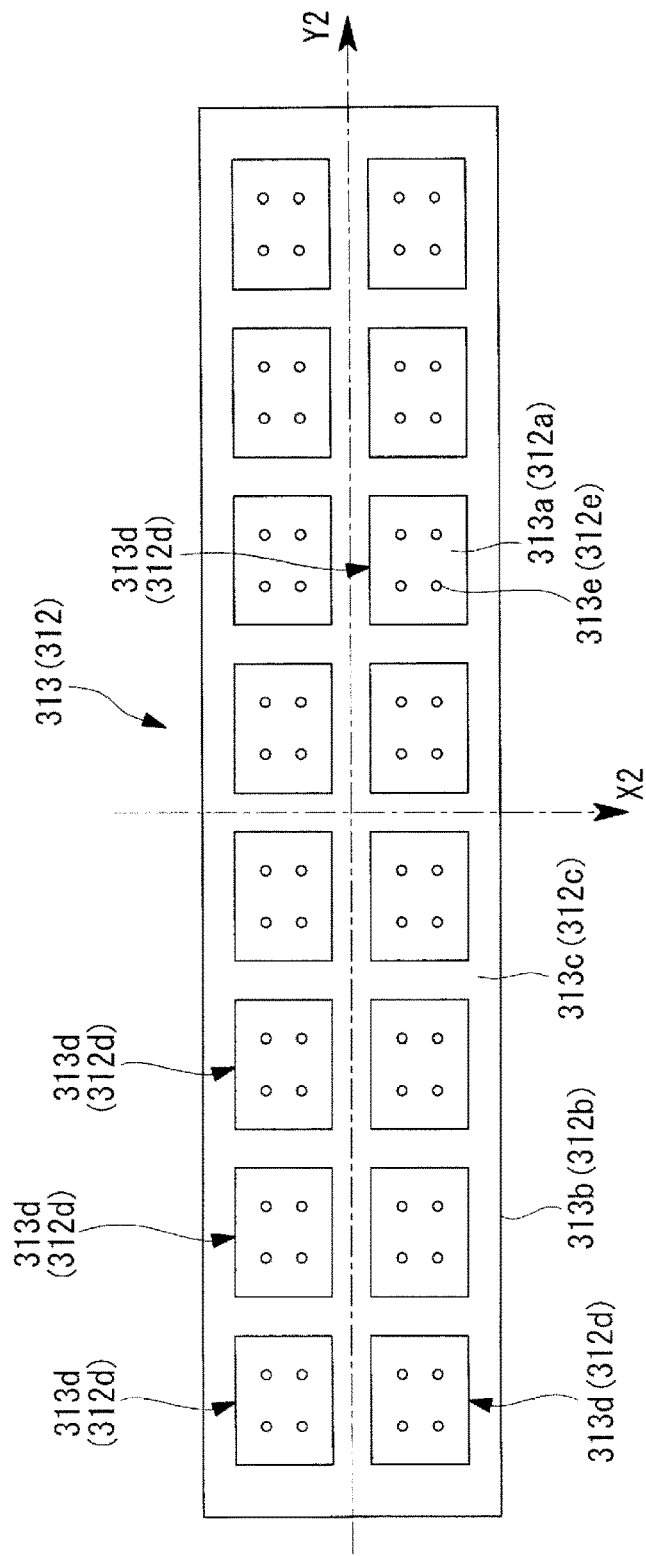
FIG. 9 is a view of a suction surface illustrated in FIG. 8, from the bottom surface side.

As illustrated in FIG. 9 (the view of the suction surface illustrated in FIG. 8, from the bottom surface side), the suction surface 313c is formed into a rectangle that is short in the direction of the axial line X2 and long in the direction of the axial line Y2 orthogonal to the axial line X2. Sixteen through-holes 313d having a rectangular shape in plan view are formed in the sponge part 313b of the suction mechanism 313.

Four sucking holes 313e are provided in a position, corresponding to each of the through-holes 313d of the sponge part 313b, of the suction part 313a. The sucking holes 313e are connected to a negative pressure source (not illustrated).

The number of the through-holes 313d formed in the sponge part 313b and the number of the sucking holes 313e provided to the suction part 313a can be determined as desired.

Similarly, the suction surface 312c is formed into a rectangle that is short in the direction of the axial line X2 and long in the direction of the axial line Y2 orthogonal to the axial line X2. Sixteen through-holes 312d having a rectangular shape in plan view are formed in the sponge part 312b of the suction mechanism 312.

Four sucking holes 312e are provided in a position, corresponding to each of the through-holes 312d of the sponge part 312b, of the suction part 312a. The sucking holes 312e are connected to a negative pressure source (not illustrated).

The number of the through-holes 312d formed in the sponge part 312b and the number of the sucking holes 312e provided to the suction part 312a can be determined as desired.

When the suction surface 312c of the suction mechanism 312 comes close to the plate-shaped structural member 200, only the portion of the sponge part 312b where no through-hole 312d is formed comes into contact with the plate-shaped structural member 200. The through-holes 312d of the sponge part 312b become closed spaces defined by the plate-shaped structural member 200, suction part 312a, and sponge part 312b. Air in the closed spaces is sucked from the sucking holes 312e and discharged to the outside. The pressure in the closed spaces is thus in a negative pressure state in which the pressure is lower than atmospheric pressure, thereby attaching the plate-shaped structural member 200 to the suction surface 312c by suction.

Similarly, when the suction surface 313c of the suction mechanism 313 comes close to the plate-shaped structural member 200, only the portion of the sponge part 313b where no through-hole 313d is formed comes into contact with the plate-shaped structural member 200. The through-holes 313d of the sponge part 313b become closed spaces defined by the plate-shaped structural member 200, suction part 313a, and sponge part 313b. Air in the closed spaces is sucked from the sucking holes 313e and discharged to the outside. The pressure in the closed spaces is thus in a negative pressure state in which the pressure is lower than atmospheric pressure, thereby attaching the plate-shaped structural member 200 to the suction surface 313c by suction.

The pair of first angle adjustment mechanisms 314, 315 of the suction hand 310 will now be described.

Figure 10:
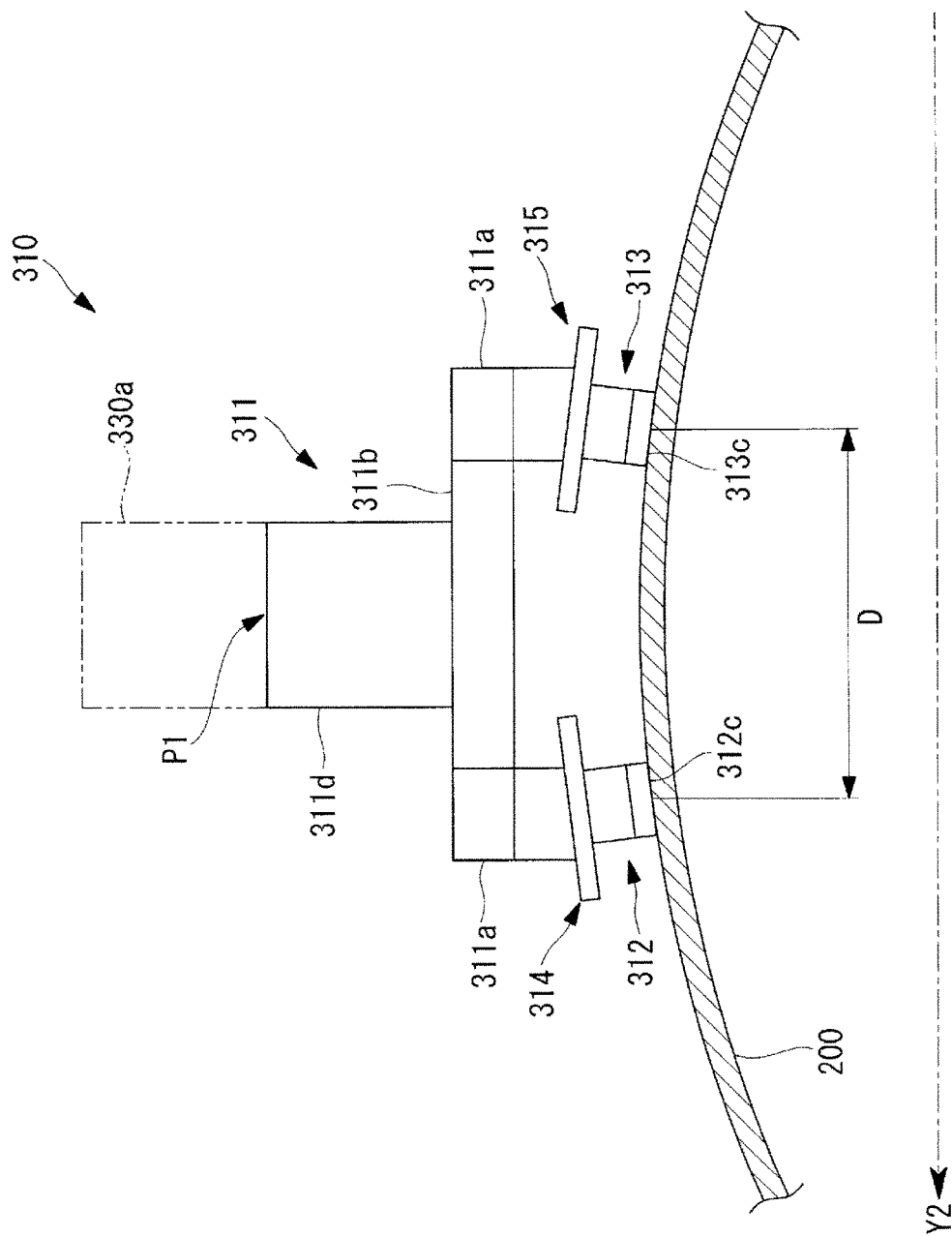
FIG. 10 is a view of the suction hand, taken along the line A-A in FIG. 7.

As illustrated in FIG. 10 (the view of the suction hand, taken along the line A-A in FIG. 7), the first angle adjustment mechanism 314 attaches the suction mechanism 312 to the first support member 311a. The first angle adjustment mechanism 315 attaches the suction mechanism 313 to the first support member 311a.

The pair of suction mechanisms 312, 313 includes the pair of suction surfaces 312c, 313c to which the plate-shaped structural member 200 having a curvature at least in the direction of the axial line X2 is attached by suction.

As illustrated in FIG. 11 (the partially enlarged view of the first angle adjustment mechanism 314 illustrated in FIG. 10), the first angle adjustment mechanism 314 includes a plate-shaped member 314a having a bottom surface to which the suction part 312a is attached, a rocking member 314b attached to the upper surface of the plate-shaped member 314a, a pair of first angle adjustment members 314c attached to the bottom surface of the first support member 311a, a pair of fixing pins 314d inserted into female screws that are fastening holes formed in the pair of first angle adjustment members 314c, and a second angle adjustment member 314e attached to the bottom surface of the first support member 311a.

The second angle adjustment member 314e illustrated in FIG. 11 supports a support shaft 314f inserted into a through-hole formed in the rocking member 314b. As indicated by an arrow in FIG. 11, the rocking member 314b supported by the support shaft 314f can rock about the support shaft 314f.

The leading end positions of the pair of fixing pins 314d having peripheral surfaces formed like male screws are adjusted by adjusting the amount of fastening the fixing pins 314d into the fastening holes of the pair of first angle adjustment members 314c (the amount of rotation of the fixing pins 314d about the axes). As illustrated in FIG. 11, the leading ends of the pair of fixing pins 314d are bumped against the right side surface and left side surface of the rocking member 314b, thereby fixing a rocking angle of the rocking member 314b about the support shaft 314f.

As illustrated in FIG. 11, the rocking angle of the rocking member 314b about the support shaft 314f corresponds to an angle θ of inclination of the suction surface 312c of the suction mechanism 312 with respect to the axial line X2. The first angle adjustment mechanism 314 can adjust the angle θ of inclination of the suction surface 312c of the suction mechanism 312 with respect to the direction of the axial line X2 (first direction).

The first angle adjustment mechanism 314 is described in FIG. 11. The first angle adjustment mechanism 315 has the same structure as the first angle adjustment mechanism 314.

In this way, the suction hand 310 of the present embodiment includes the pair of first angle adjustment mechanisms 314, 315 that can adjust the angle θ of inclination of the suction surface 312c, 313c of each of the pair of suction mechanisms 312, 313 with respect to the axial line X2.

The attachment position of the plate-shaped member 314a with respect to the rocking member 314b illustrated in FIG. 11 can be moved along the axial line X2. The attachment position of the plate-shaped member 314a with respect to the rocking member 314b can be moved from the position illustrated in FIG. 11 to a position indicated by the solid line in FIG. 12 or a position indicated by the dashed line in FIG. 12.

Figure 12:
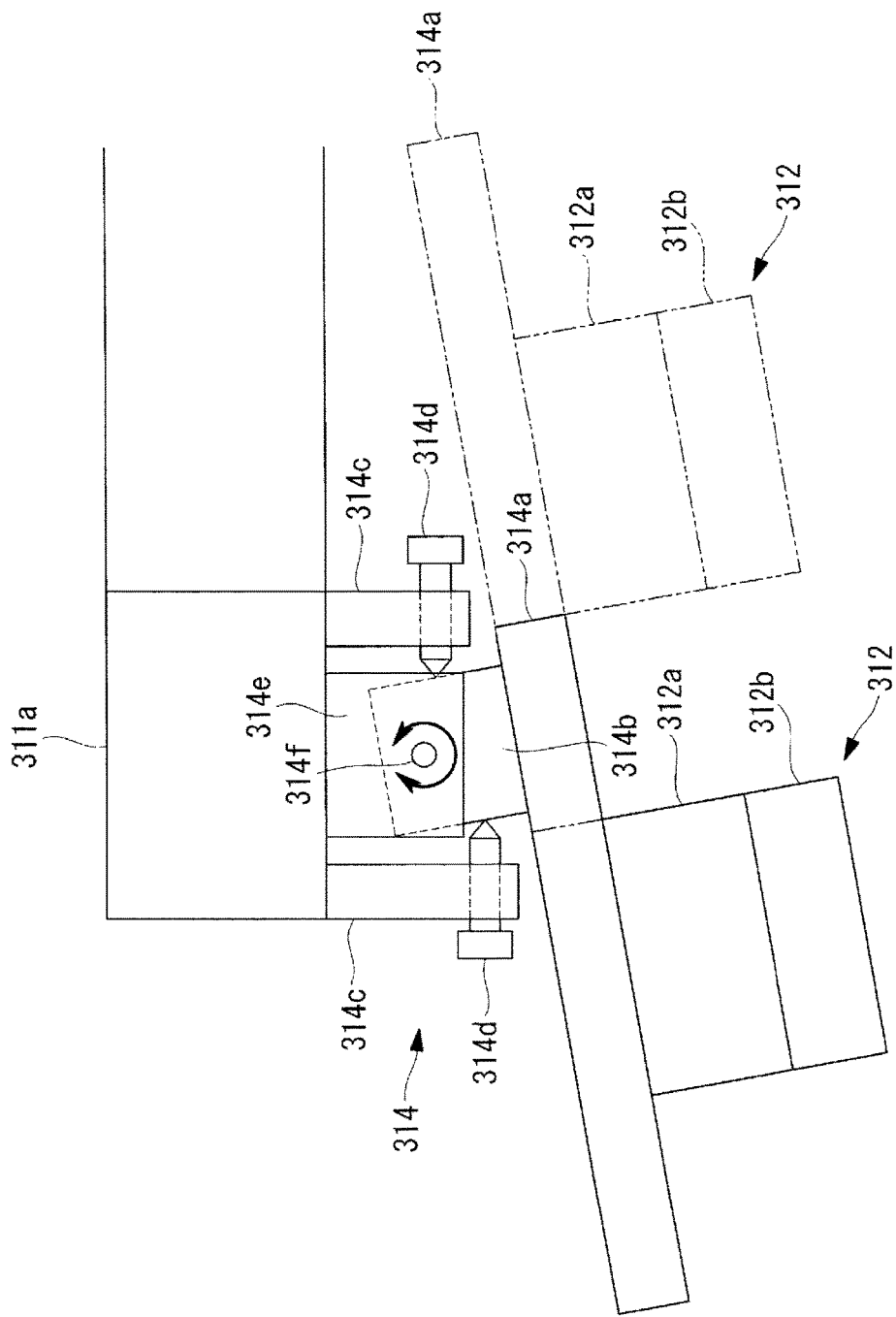
FIG. 12 is a partially enlarged view of the first angle adjustment mechanism illustrated in FIG. 10 and a view illustrating a state in which a suction mechanism is moved.

If the attachment position of the plate-shaped member 314a with respect to the rocking member 314b is moved from the position illustrated in FIG. 11 to the position indicated by the solid line in FIG. 12, the arrangement distance D between the pair of suction mechanisms 312, 313 illustrated in FIG. 10 is increased along the axial line X2. If the attachment position of the plate-shaped member 314a with respect to the rocking member 314b is moved from the position illustrated in FIG. 11 to the position indicated by the dashed line in FIG. 12, the arrangement distance D between the pair of suction mechanisms 312, 313 illustrated in FIG. 10 is decreased along the axial line X2.

In this way, the pair of first angle adjustment mechanisms 314, 315 of the present embodiment can adjust the arrangement distance D between the pair of suction mechanisms 312, 313 in the direction of the axial line X2. For example, if the plate-shaped structural member 200 has a small radius of curvature in the direction of the axial line X2, the arrangement distance D is decreased. If the plate-shaped structural member 200 has a large radius of curvature in the direction of the axial line X2, the arrangement distance D is increased. This increase or decrease allows the pair of suction mechanisms 312, 313 to be arranged in appropriate positions for the curvature of the plate-shaped structural member 200 in the direction of the axial line X2 and ensures that the plate-shaped structural member 200 is attached by suction.

A method of conveying the plate-shaped structural member 200 with the holding devices 300, 400 of the present embodiment will now be described.

The holding devices 300, 400 of the present embodiment hold the plate-shaped structural member 200 retained on the supplying stage 500 and convey the plate-shaped structural member 200 to the assembly jig 100, using the following procedure.

First, an operator operating the holding devices 300, 400 adjusts the angles θ of inclination of the suction surfaces 312c, 313c with the first angle adjustment mechanisms 314, 315 so as to obtain the angles θ of inclination appropriate for the shape (curvature) of the plate-shaped structural member 200 retained on the supplying stage 500 (step (a)). This adjustment is performed by adjusting the amount of fastening the fixing pins 314d of the first angle adjustment mechanisms 314 to adjust the rocking angles of the rocking members 314b about the support shafts 314f. The adjustment with the first angle adjustment mechanisms 315 is performed in a similar manner.

Second, the operator operating the holding devices 300, 400 inputs a control command to the control device 600 so that the articulated arms 330, 430 are operated to bring the pair of suction surfaces 312c, 313c of the pair of suction mechanisms 312, 313 into contact with the plate-shaped structural member 200 (step (b)).

The control device 600 causes the pair of suction surfaces 312c, 313c of the pair of suction mechanisms 312, 313 to come into contact with the plate-shaped structural member 200, with the direction in which the plate-shaped structural member 200 has a curvature (the direction of the axial line X1 in FIGS. 1 and 3) coinciding with the directions of the axial lines X2 of the suction hands 310, 410.

Figure 13:
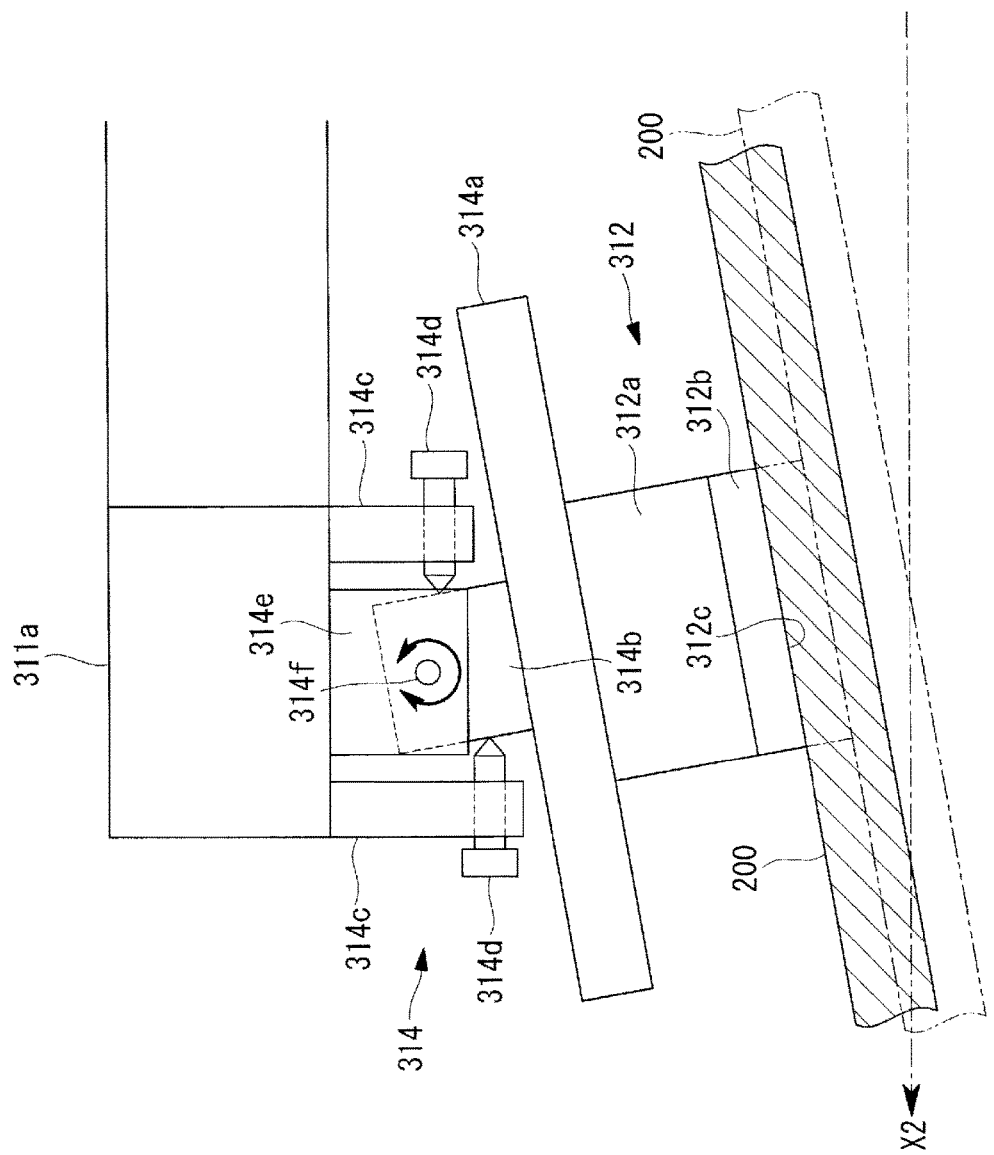
FIG. 13 is a partially enlarged view of the first angle adjustment mechanism illustrated in FIG. 10 and a view illustrating a state in which the suction mechanism comes into contact with the plate-shaped structural member.

FIG. 13 illustrates a state in which the suction surface 312c of the suction mechanism 312 comes into contact with the plate-shaped structural member 200. The dashed line illustrated in FIG. 13 indicates a state before the suction surface 312c of the suction mechanism 312 comes into contact with the plate-shaped structural member 200. The plate-shaped structural member 200 is moved with respect to the suction mechanism 312 from the state before the contact with the suction surface 312c to the state after the contact in FIG. 13; however, the suction mechanism 312 is actually moved approaching the plate-shaped structural member 200 while the plate-shaped structural member 200 is retained in a certain position on the supplying stage 500.

As illustrated in FIG. 13, the sponge part 312b of the suction mechanism 312 is thinner than before the sponge part 312b comes into contact with the plate-shaped structural member 200. This is because force of the articulated arm 330 pressing the sponge part 312b against the plate-shaped structural member 200 shrinks the sponge part 312b. In the sponge part 312b that becomes thinner by shrinkage, an air flow from the side surfaces to the inside is blocked or suppressed. Thus, negative pressure produced in the sponge part 312b by the suction part 312a prevents outside air from flowing into the sponge part 312b.

The force of the articulated arm 330 pressing the sponge part 312b against the plate-shaped structural member 200 is preferably adjusted so that, for example, the thickness of the sponge part 312b becomes half or less of that before the pressing. Alternatively, the force is preferably adjusted so that the sponge part 312b is shrunk by at least a predetermined thickness (for example, 10 mm).

Third, the operator operating the holding devices 300, 400 inputs a control command to the control device 600 so that the plate-shaped structural member 200 is attached by suction to the pair of suction surfaces 312c, 313c with the pair of suction surfaces 312c, 313c being in contact with the plate-shaped structural member 200 (step (c)). Specifically, the operator inputs a control command to the control device 600 so that the suction hands 310, 410 discharge air in the sponge parts 312b from the sucking holes 312e, 313e to the outside.

Fourth, the operator operating the holding devices 300, 400 inputs a control command to the control device 600 so that the control device 600 causes the holding devices 300, 400 to convey the plate-shaped structural member 200 to the assembly jig 100 with the plate-shaped structural member 200 attached by suction to the pair of suction surfaces 312c, 313c.

In this way, the holding devices 300, 400 of the present embodiment hold the plate-shaped structural member 200 retained on the supplying stage 500 and convey the plate-shaped structural member 200 to the assembly jig 100.

The actions and effects exhibited by the above-described present embodiment will now be described.

The suction hands 310, 410 of the present embodiment bring the pair of suction mechanisms 312, 313 close to the plate-shaped structural member 200 so that the directions of the axial lines X2 of the suction hands 310, 410 coincide with the direction of the axial line X1 in which the plate-shaped structural member 200 has a curvature, to thereby bring the pair of suction surfaces 312c, 313c into contact with the plate-shaped structural member 200, the pair of suction mechanisms 312, 313 being disposed apart from each other in the directions of the axial lines X2 with the attachment positions P1 of the suction hands 310, 410 to the leading-end sections 330a, 430a of the articulated arms 330, 430 interposed therebetween. The pair of suction mechanisms 312, 313 are attached by suction to the plate-shaped structural member 200 with the pair of suction surfaces 312c, 313c being in contact with the plate-shaped structural member 200, and the plate-shaped structural member 200 is thus held by the leading-end sections 330a, 430a of the articulated arms 330, 430. The plate-shaped structural member 200 has a curvature in the direction of the axial line X1; however, the first angle adjustment mechanisms 314, 315 adjust the angles θ of inclination of the suction surfaces 312c, 313c in the direction coinciding with the direction of the axial line X1, so that each of the pair of suction surfaces 312c, 313c is attached by suction to the plate-shaped structural member 200 along the shape of the plate-shaped structural member 200 having a curvature.

In this way, the suction hands 310, 410 of the present embodiment can adjust the angles of inclination of the suction surfaces 312c, 313c appropriately for the shape of the plate-shaped structural member 200 having a curvature in the direction of the axial line X1 and can be attached by suction to the plate-shaped structural member 200, without preparing dedicated components for a plurality of types of plate-shaped structural member 200 or replacing the dedicated components every time the type of plate-shaped structural member 200 to be conveyed is changed.

In the suction hands 310, 410 of the present embodiment, each of the pair of suction surfaces 312c, 313c is formed into a rectangle that is short in the direction of the axial line X2 and long in the direction of the axial line Y2 orthogonal to the direction of the axial line X2.

This configuration allows the plate-shaped structural member 200 having a curvature to be attached by suction in pairs of positions in the direction of the axial line X2 along the shape of the plate-shaped structural member 200 and to be securely attached by suction in a wide area in the direction of the axial line Y2 orthogonal to the direction of the axial line X2.

Second Embodiment

An assembly system according to a second embodiment of the present invention will be described below with reference to the drawing.

The assembly system of the present embodiment is a modified example of the assembly system 700 of the first embodiment and has the same configuration as that of the first embodiment unless otherwise described below.

The assembly system 700 of the first embodiment includes the suction hand 310 that maintains the pairs of suction surfaces 312c, 313c arranged along the axial line Y2, parallel to the axial line Y2. This suction hand 310 of the first embodiment is based on the premise that the plate-shaped structural member 200 to be attached by suction does not have a curvature in the direction of the axial line Y2.

In contrast, the assembly system of the present embodiment includes a suction hand 310' that includes second angle adjustment mechanisms 316 capable of inclining pairs of suction surfaces 312c', 313c' arranged along the axial line Y2 with respect to the axial line Y2. The suction hand 310' of the present embodiment has a structure capable of attaching a plate-shaped structural member 200 having a curvature in the direction of the axial line Y2 by suction.

Figure 14:
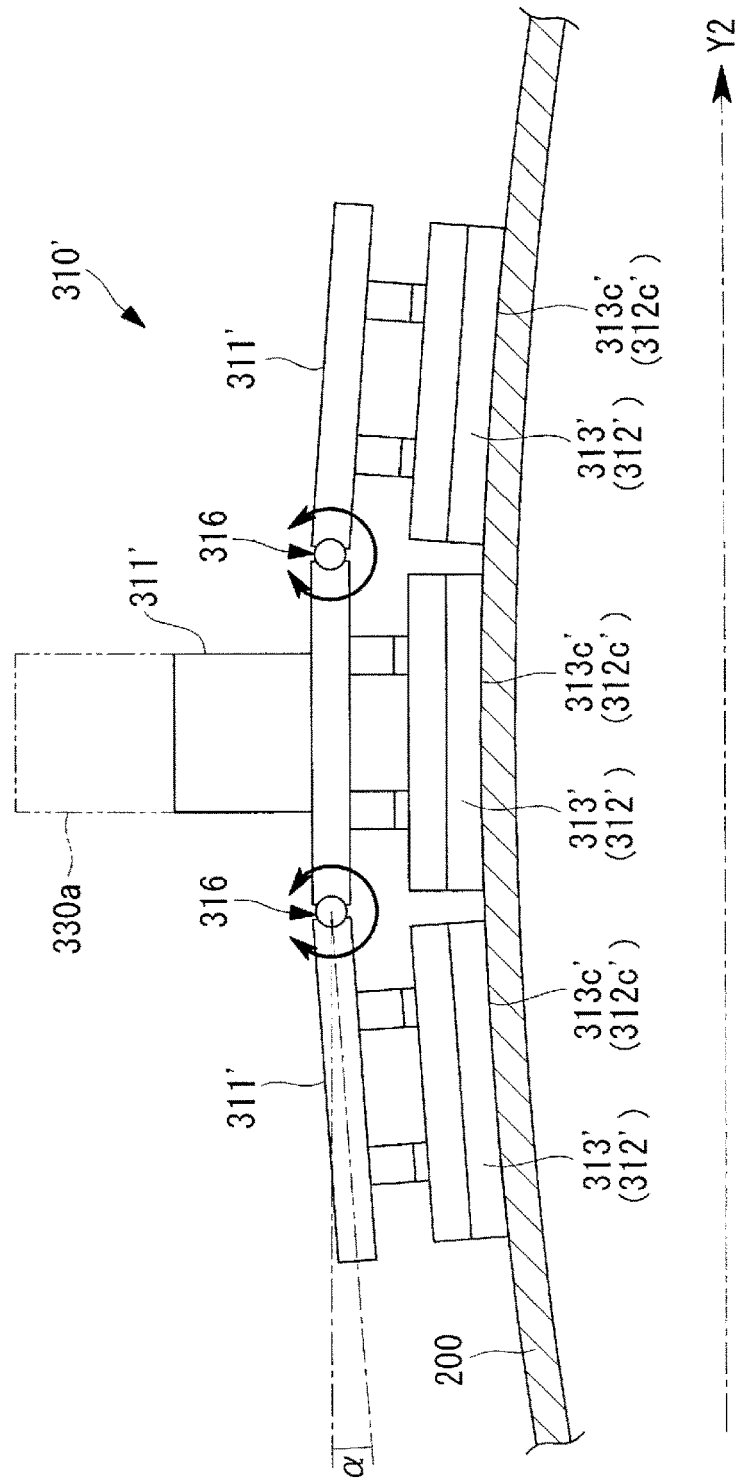
FIG. 14 is a vertical cross-sectional view of a floating mechanism connecting a leading-end section of an articulated arm to a support part.

As illustrated in FIG. 14, the suction hand 310' of the present embodiment includes three pairs of suction mechanisms 312', 313' arranged in the direction of the axial line Y2. In FIG. 14, which is a front view, the three suction mechanisms 313' arranged along the axial line Y2 are illustrated. Reference signs in parentheses in FIG. 14 indicate the suction mechanisms 312' and suction surfaces 312c' when the suction hand 310' is viewed from the back side.

As illustrated in FIG. 14, the suction hand 310' of the present embodiment includes the second angle adjustment mechanism 316 that is disposed between a support part 311' supporting a first pair of suction mechanisms 312', 313' (mechanisms illustrated on the left side in FIG. 14) and a support part 311' supporting a second pair of suction mechanisms 312', 313' (mechanisms illustrated at the center in FIG. 14), the first and second pairs of suction mechanisms 312', 313' being adjacent to each other in the direction of the axial line Y2, and able to adjust angles of inclination of the pair of suction surfaces 312c', 313c' in the direction of the axial line Y2.

If the angle of inclination of the suction mechanism 313' illustrated at the center in FIG. 14 is fixed, the second angle adjustment mechanism 316 can adjust the angle α of inclination of the suction mechanism 313' on the left side with respect to the angle of inclination of the suction mechanism 313' at the center.

With the suction hand 310' of the present embodiment, even if the plate-shaped structural member 200 has a double curved shape having a curvature in the direction of the axial line X1 and a curvature in the direction of the axial line Y1 orthogonal to the direction of the axial line X1 (a shape having different curvatures in two axial directions in plane), the second angle adjustment mechanisms 316 adjust the angles of inclination of the suction surfaces 312c', 313c'. The suction surfaces 312c', 313c' are thus attached by suction to the plate-shaped structural member 200 along the shape of the plate-shaped structural member 200 having a curvature in the direction of the axial line Y1 orthogonal to the direction of the axial line X1.

In this way, the present embodiment ensures that the plate-shaped structural member 200 is attached by suction along the double curved shape of the plate-shaped structural member 200 with the pair of suction mechanisms 312', 313'.

Other Embodiments

Figure 15:
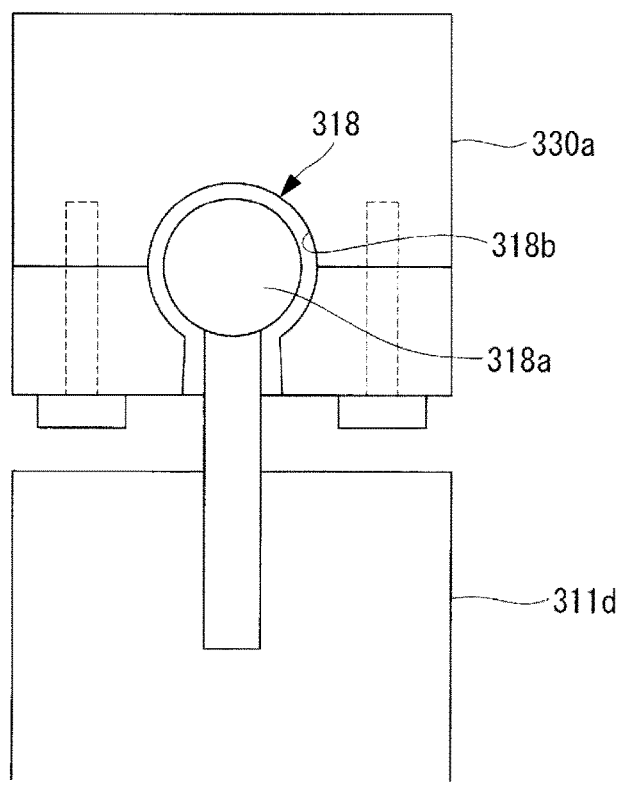
FIG. 15 is a front view of a suction hand of a second embodiment.

As a structure connecting the leading-end section 330a of the articulated arm 330 to the fourth support member 311d of the support part 311, a floating mechanism 318 illustrated in FIG. 15 may be used, for example.

The floating mechanism 318 includes a shaft member 318a that has a spherical leading end and is attached to the support part 311 and a housing chamber 318b that is formed in the leading-end section 330a and houses the leading end of the shaft member 318a.

The leading end of the shaft member 318a is rotatably housed in the housing chamber 318b and can thus be rotated within a certain permissible range of the angle of attachment of the support part 311 to the leading-end section 330a of the articulated arm 330 (for example, one degree). Accordingly, even if an error occurs in positioning the leading-end section 330a of the articulated arm 330, the error can be reduced within the certain permissible range of the angle (for example, one degree).

The outer diameter of the spherical leading end of the shaft member 318a may be smaller than the inner diameter of the housing chamber 318b in a minute degree. This floating mechanism 318, for example, allows the angle of attachment of the support part 311 to the leading-end section 330a of the articulated arm 330 to vary within a certain permissible range of the angle (for example, one degree). Accordingly, even if an error occurs in positioning the leading-end section 330a of the articulated arm 330, the error can be reduced within the certain permissible range of the angle (for example, one degree).

The above-described first angle adjustment mechanisms 314, 315 and second angle adjustment mechanisms 316 may use drive mechanisms, such as motors, to adjust the angles of inclination of the suction surfaces 312c, 313c.

In this case, the operator of the holding devices 300, 400 inputs, to the control device 600, a control command for controlling the first angle adjustment mechanisms 314, 315 and second angle adjustment mechanisms 316 and thereby adjusts the angles of inclination of the suction surfaces 312c, 313c as desired.

REFERENCE SIGNS LIST

100 Assembly jig (Positioning device)
110 Support part
120, 121 Positioning part
200 Plate-shaped structural member (Plate-shaped member)
210, 211 Protruding part
220, 221 Positioning hole
300, 400 Holding device
310, 310', 410 Suction hand (Suction device)
311, 311' Support part
312, 312', 313, 313' Suction mechanism
312a, 313a Suction part
312b, 313b Sponge part
312c, 312c', 313c, 313c' Suction surface
314, 315 First angle adjustment mechanism
316 Second angle adjustment mechanism
318 Floating mechanism
320, 420 Imaging apparatus
330, 430 Articulated arm (Articulated drive mechanism)
330a, 430a Leading-end section
500 Supplying stage
600 Control device
700 Assembly system
P1 Attachment position
X1, X2, Y1, Y2 Axial line

The invention claimed is:

1. A suction device adapted to be attached to a leading-end section of an articulated drive mechanism and adapted to be attached by suction to a plate-shaped structural member having a curvature at least in a predetermined direction, the suction device comprising:
a support part configured to be attached to the leading-end section of the articulated drive mechanism;
a pair of suction mechanisms comprising a pair of suction surfaces and disposed apart from each other in a first direction with an attachment position of the support part interposed between the pair of suction mechanisms; and
a pair of first angle adjustment mechanisms configured to adjust an angle of inclination, with respect to the first direction, of each of the pair of suction surfaces of the pair of suction mechanisms,
wherein each of the pair of first angle adjustment mechanisms comprises:
a plate-shaped member having a bottom surface to which a corresponding one of the pair of suction mechanisms is attached,
a rocking member attached to an upper surface of the plate-shaped member,
a support shaft inserted into a through-hole of the rocking member,
a pair of first angle adjustment members attached to a bottom surface of the support part,
a pair of fixing pins inserted into female screws that are fastening holes of the pair of first angle adjustment members, and
a second angle adjustment member attached to the bottom surface of the support part and supporting the support shaft.

2. The suction device according to claim 1, wherein each of the pair of suction surfaces is a rectangle having shorter sides in the first direction and longer sides in a second direction orthogonal to the first direction.

3. The suction device according to claim 2, further comprising:
a plurality of pairs of suction mechanisms arranged in the second direction,
the plurality of pairs of suction mechanisms comprising first and second pairs of suction mechanisms adjacent to each other in the second direction, and
each of the first pair of suction mechanisms and the second pair of suction mechanisms comprising a pair of suction surfaces; and
a second angle adjustment mechanism disposed between the first pair of suction mechanisms and the second pair of suction mechanisms and configured to adjust
angles of inclination, with respect to the second direction, of the pair of suction surfaces of the first pair of suction mechanisms and
angles of inclination, with respect to the second direction, of the pair of suction surfaces of the second pair of suction mechanisms.

4. A holding device comprising:
the suction device according to claim 1; and an articulated drive mechanism comprising a leading-end section to which the suction device is attached.

5. The suction device according to claim 1, wherein the fixing pins are male screws including leading ends in direct contact with opposite surfaces of the rocking member in the first direction to set a rocking angle of the rocking member about the support shaft.

6. The suction device according to claim 1, wherein, in each of the pair of first angle adjustment mechanisms, an attachment position of the plate-shaped member with respect to the rocking member is moveable in the first direction to adjust an arrangement distance between the pair of suction mechanisms in the first direction.

7. A method of conveying a plate-shaped structural member having a curvature in a predetermined direction with a holding device comprising an articulated drive mechanism and a suction device attached to a leading-end section of the articulated drive mechanism, the suction device comprising:
    a support part attached to the leading-end section of the articulated drive mechanism;
    a pair of suction mechanisms comprising a pair of suction surfaces and disposed apart from each other in a first direction with an attachment position of the support part interposed between the pair of suction mechanisms; and
    a pair of first angle adjustment mechanisms for adjusting an angle of inclination, with respect to the first direction, of each of the pair of suction surfaces of the pair of suction mechanisms;

the method comprising the steps of:
    (a) with the pair of first angle adjustment mechanisms, adjusting the angles of inclination, with respect to the first direction, of the pair of suction surfaces in accordance with the curvature of the plate-shaped structural member in the predetermined direction;
    (b) with the articulated drive mechanism, bringing the pair of suction surfaces into contact with the plate-shaped structural member with the predetermined direction coinciding with the first direction;
    (c) with the pair of suction mechanisms, attaching the plate-shaped structural member to the pair of suction surfaces by suction with the pair of suction surfaces being in contact with the plate-shaped structural member in step (b); and
    (d) with the articulated drive mechanism, conveying the plate-shaped structural member with the plate-shaped structural member attached by suction to the pair of suction surfaces in step (c), wherein each of the pair of first angle adjustment mechanisms comprises:
    a plate-shaped member having a bottom surface to which a corresponding one of the pair of suction mechanisms is attached,
    a rocking member attached to an upper surface of the plate-shaped member,
    a support shaft inserted into a through-hole of the rocking member,
    a pair of first angle adjustment members attached to a bottom surface of the support part,
    a pair of fixing pins inserted into female screws that are fastening holes of the pair of first angle adjustment members, and
    a second angle adjustment member attached to the bottom surface of the support part and supporting the support shaft.

8. The method according to claim 7, wherein, in step (a), the adjusting the angles of inclination includes adjusting an amount of fastening between the fixing pins and the fastening holes.

9. The method according to claim 7, wherein
the fixing pins are male screws including leading ends in direct contact with opposite surfaces of the rocking member in the first direction to set a rocking angle of the rocking member about the support shaft, and
in step (a), the adjusting the angles of inclination includes adjusting an amount of fastening between the males screws and the female screws to adjust the rocking angle of the rocking member about the support shaft.

\* \* \* \* \*